United States Patent
Wang

(10) Patent No.: US 6,622,652 B1
(45) Date of Patent: Sep. 23, 2003

(54) WARMING BED FOR PETS

(75) Inventor: Chiao-Ming Wang, Taichung Hsien (TW)

(73) Assignee: Meiko Pet Corporation, Taichung Hsien (TW)

( * ) Notice: Subject to any disclaimer, the term of this patent is extended or adjusted under 35 U.S.C. 154(b) by 0 days.

(21) Appl. No.: 10/278,781

(22) Filed: Oct. 24, 2002

(51) Int. Cl.[7] ............................................. A01K 29/00
(52) U.S. Cl. .................................................. 119/28.5
(58) Field of Search ............................... 119/28.5, 482, 119/526; D30/118; 5/421; 219/217

(56) References Cited

U.S. PATENT DOCUMENTS

| | | | | |
|---|---|---|---|---|
| 2,612,585 A | * | 9/1952 | McCann | 392/435 |
| 2,617,005 A | * | 11/1952 | Jorgensen | 219/508 |
| 2,866,066 A | * | 12/1958 | Neely | 219/536 |
| 2,961,524 A | * | 11/1960 | Newman | 219/536 |
| 2,963,565 A | * | 12/1960 | Moore et al. | 219/530 |
| 3,041,441 A | * | 6/1962 | Elbert et al. | 392/435 |
| 4,257,349 A | * | 3/1981 | Carlin | 119/28.5 |
| 4,652,726 A | * | 3/1987 | Femino et al. | 219/217 |
| 5,092,271 A | * | 3/1992 | Kleinsasser | 119/508 |
| 5,371,340 A | * | 12/1994 | Stanfield | 219/217 |
| 5,456,209 A | * | 10/1995 | Heinrich | 119/450 |
| 6,084,209 A | * | 7/2000 | Reusche et al. | 219/217 |
| 6,189,487 B1 | * | 2/2001 | Owen et al. | 119/28.5 |
| 6,237,531 B1 | * | 5/2001 | Peeples et al. | 119/28.5 |

FOREIGN PATENT DOCUMENTS

GB  2030437  *  4/1980

* cited by examiner

Primary Examiner—Peter M. Poon
Assistant Examiner—David Parsley
(74) Attorney, Agent, or Firm—Rosenberg, Klein & Lee

(57) ABSTRACT

An improved warming bed for pets generates different temperatures on two opposite sides of the bed to warm different pets in different climate conditions. The warming bed includes an upper panel and a lower panel. The inner surfaces of the upper panel and the lower panel have corresponding coupling struts and stubs and at least one press strut to form a gap of a selected distance between the upper panel and the lower panel. A heating sheet is bonded to the inner surface of the lower panel (or the upper panel) and passes through the coupling struts and stubs. When the heating sheet is heated, the lower panel in contact with the heating sheet has a higher temperature than the upper panel which is remote from the heating sheet. Thus the two sides of the warming bed have different temperatures to meet different requirements.

1 Claim, 6 Drawing Sheets

WARMING BED FOR PETS

BACKGROUND OF THE INVENTION

1. Field of the Invention

The invention relates to an improved warming bed for pets and particularly a warming bed which has two different temperatures on two opposite sides to warm pets in different climate environments.

2. Description of the Prior Art

Referring to FIG. 1, a conventional warming bed 10 for pets generally consists of an upper panel 11, a lower panel 12 and a heating wire 13 sandwiched between the upper panel 11 and the lower panel 12. The heating wire 13 connects to a power cord 14 to link power supply to generate heat for evenly warming the upper and lower panels 11 and 12 so that the pet may be warmed in the winter.

As the heating wire is located on the middle layer between the upper panel 11 and the lower panel 12, it generates heat evenly on two sides to warm the panels at only one temperature. However, there are many different types of pets, some with long hairs and have better self-warming capability, while some have short hairs and are easier to suffer from cold weather. They need different warming protection. Moreover, even in winter, climate temperature varies greatly, such as on fine days and snowy days. Hence the conventional warming bed that provides warming at only one temperature obviously cannot meet various requirements.

SUMMARY OF THE INVENTION

In view of the aforesaid disadvantages, the primary object of the invention is to provide an improved warming bed for pets that can generate two different temperatures on an upper panel and a lower panel to meet different requirements according to different environmental temperatures and different use conditions.

In order to achieve the foregoing object, the invention mainly includes an upper panel and a lower panel that have respectively an inner surface, and has a plurality of evenly spaced coupling struts and coupling stubs formed on the inner surfaces to couple with one another, and at least one press strut to form a larger gap between the upper and the lower panels. A heating sheet is located on the inner surface of the lower panel (or upper panel) and passing through the coupling struts and stubs so that the lower panel closed to the heating sheet may have a higher temperature than the upper panel remote from the heating sheet, thereby the two opposite sides of the warming bed have different temperatures to meet different requirements.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
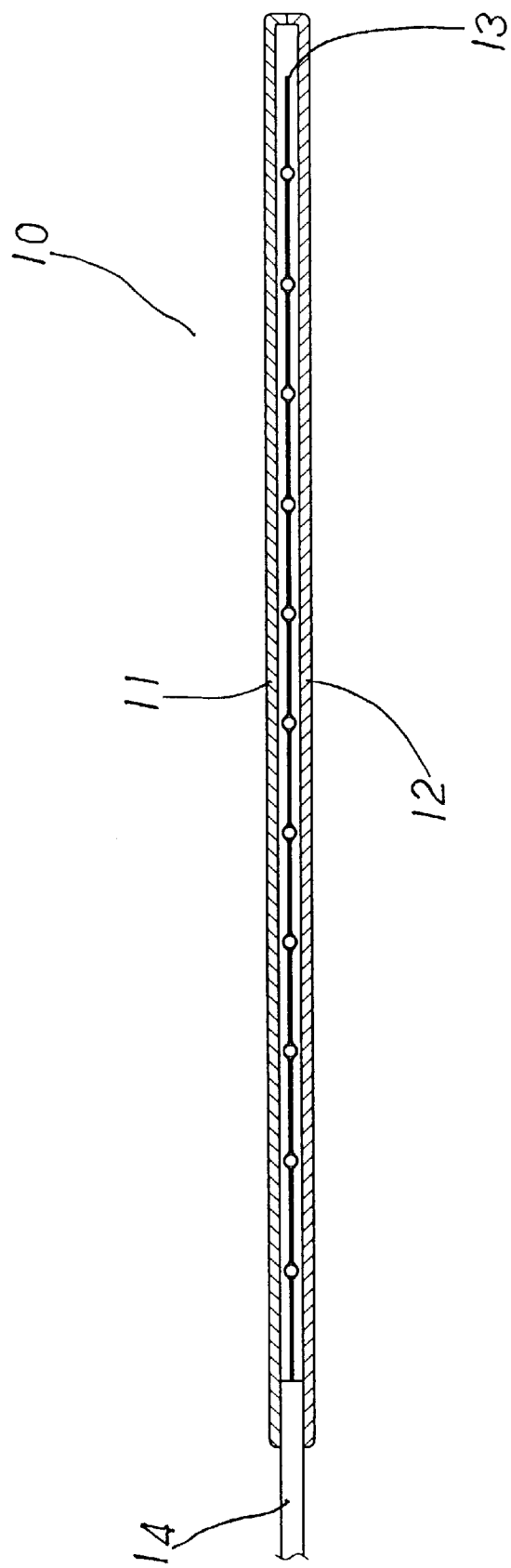
FIG. 1 is a sectional view of a conventional warming bed for pets.
Figure 2:
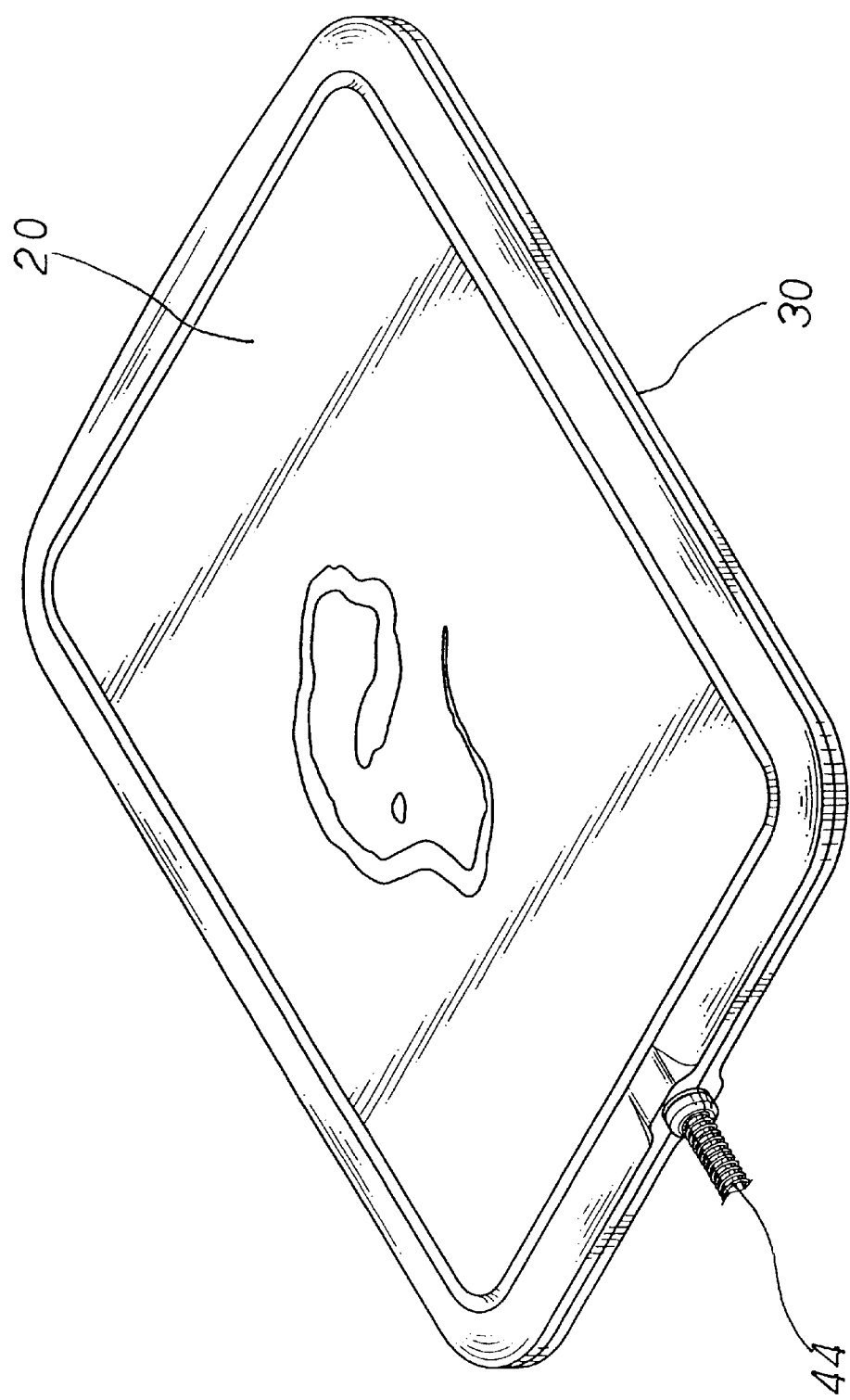
FIG. 2 is a perspective view of the invention.
Figure 3:
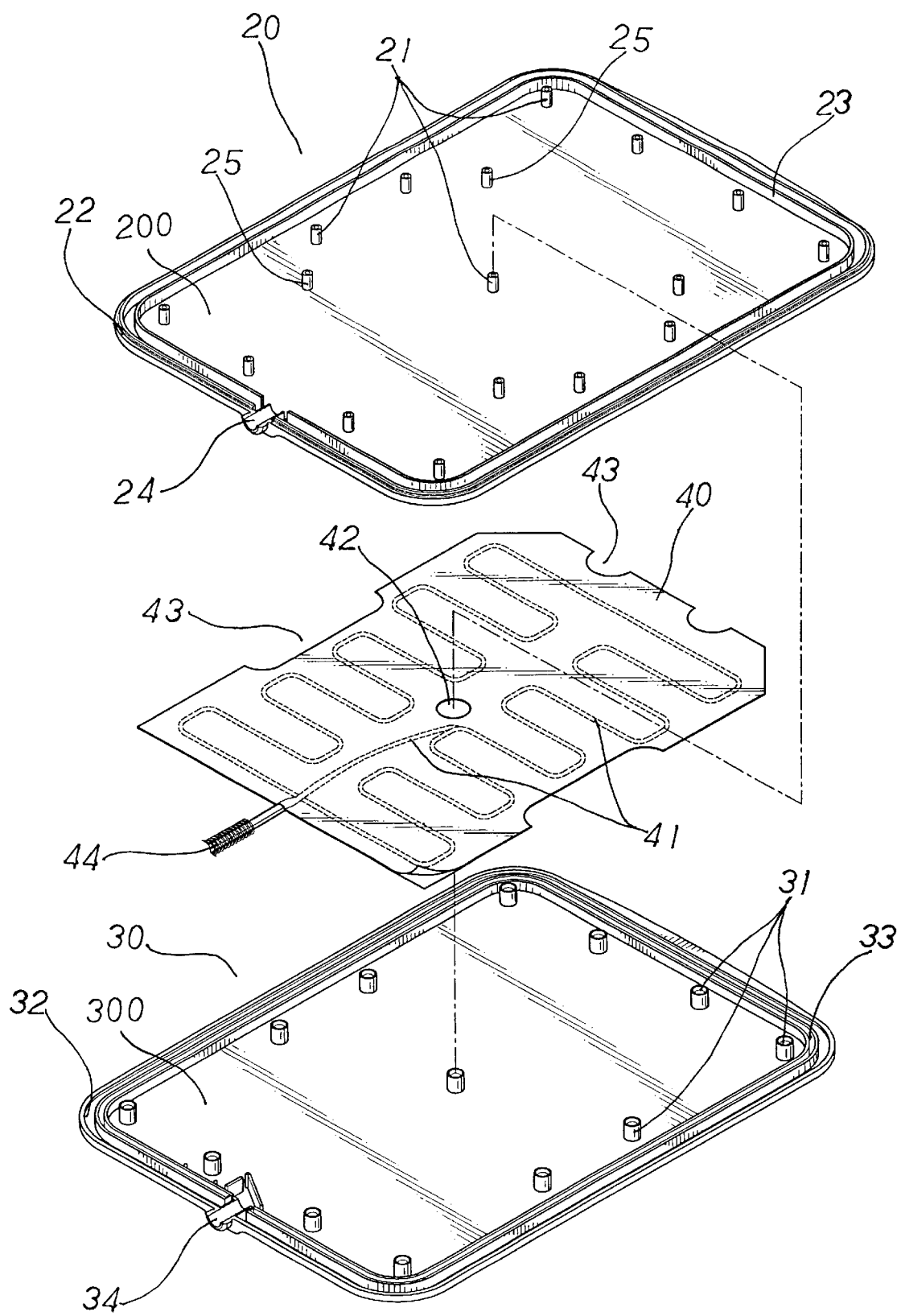
FIG. 3 is an exploded view of the invention.

Referring to FIGS. 2 and 3, the invention mainly consists of an upper panel 20, a lower panel 30 and a heating sheet 40.

The upper panel 20 has a first inner surface 200 which has a plurality of coupling struts 21 located thereon. The outer peripheral rim of the upper panel forms an annular first outer flange 22. There is an annular first inner flange 23 formed on the inner side of the periphery of the upper panel spaced from the first outer flange 22. One end of the upper panel has a first wire trough 24 running through the first outer flange 22 and the first inner flange 23. The first inner surface 200 further has at least one press strut 25 formed thereon.

The lower panel 30 has a second inner surface 300 which has a plurality of coupling stubs 31 located thereon. The outer peripheral rim of the lower panel forms an annular second outer flange 32. There is an annular inner trough 33 formed on the inner side of the periphery of the lower panel spaced from the second outer flange 32. One end of the lower panel has a second wire trough 34 running through the second outer flange 32 and the inner trough 33.

The heating sheet 40 is bonded to the second inner surface 300 of the lower panel 30 (or the first inner surface 200 of the upper panel 20) and has a heating wire laid thereon. The heating sheet 40 further has a hole 42 and notches 43 formed thereon corresponding to where the coupling struts 21 and stubs 31 are located. The heating wire 41 connects to a power cord 44 for linking to the external power supply.

Figure 4:
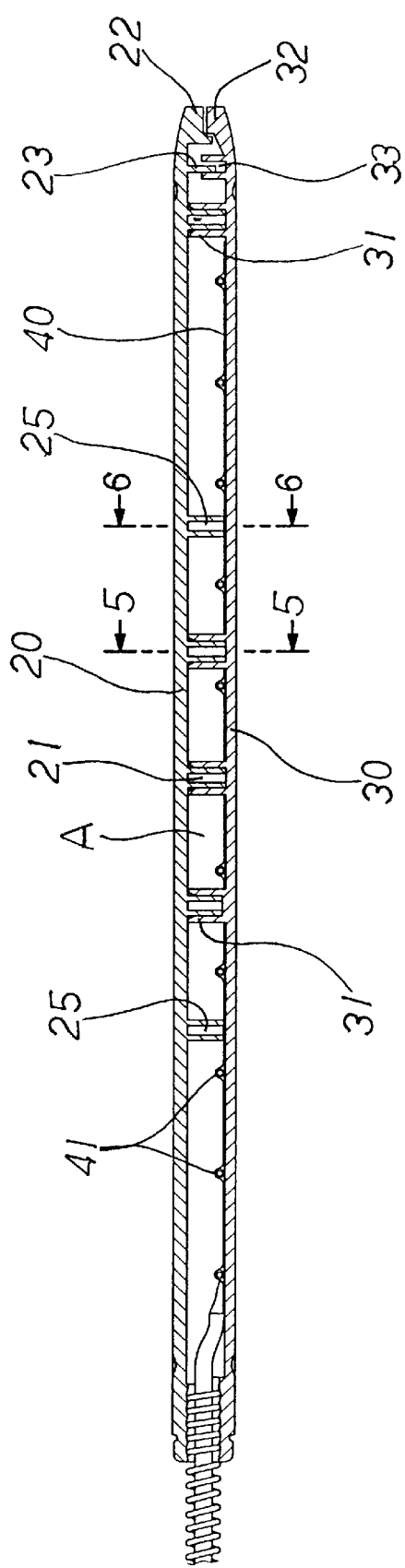
FIG. 4 is a sectional view of the invention.
Figure 5:
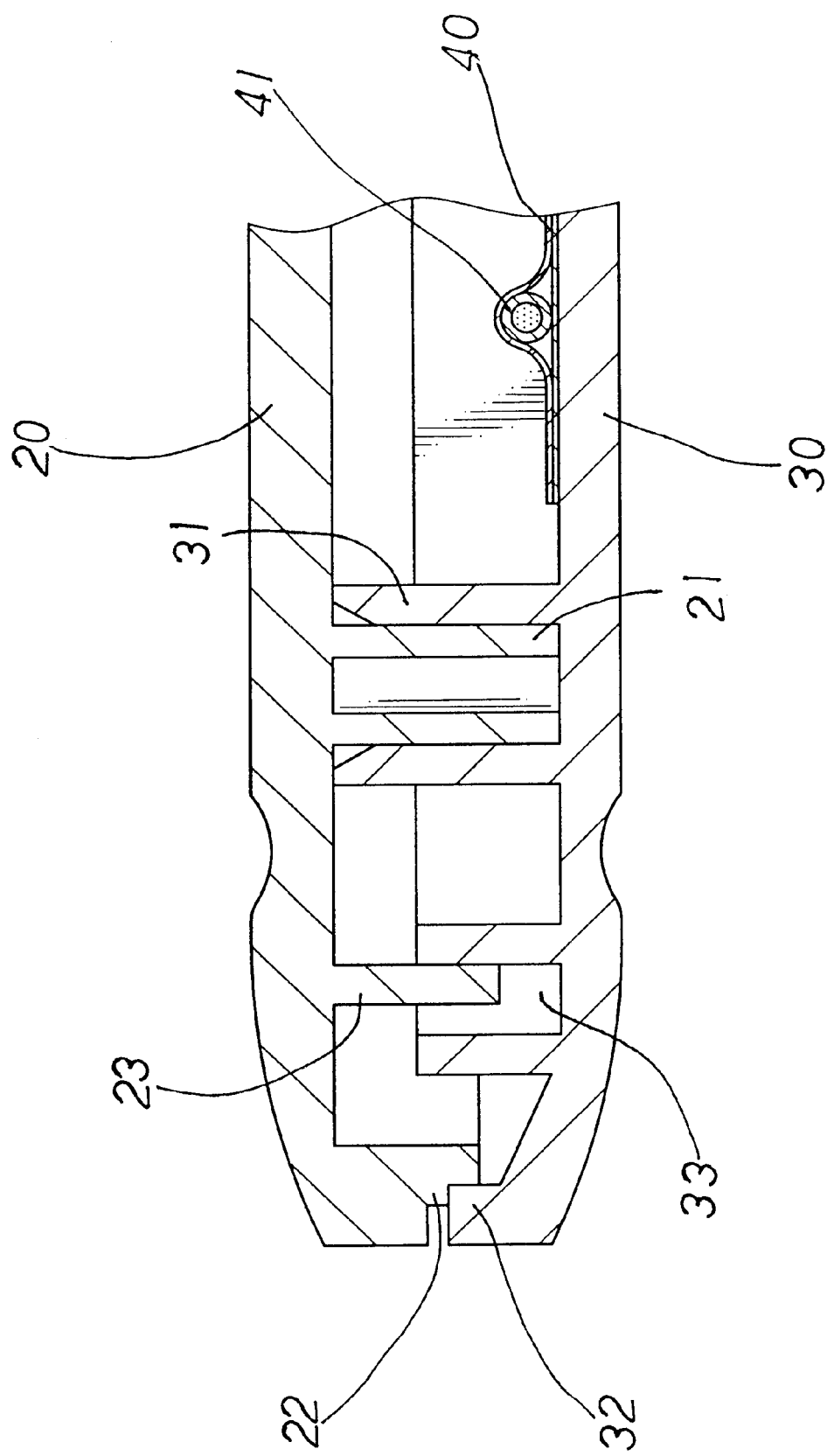
FIG. 5 is a fragmentary cross section taken along line 5—5 in FIG. 4.
Figure 6:
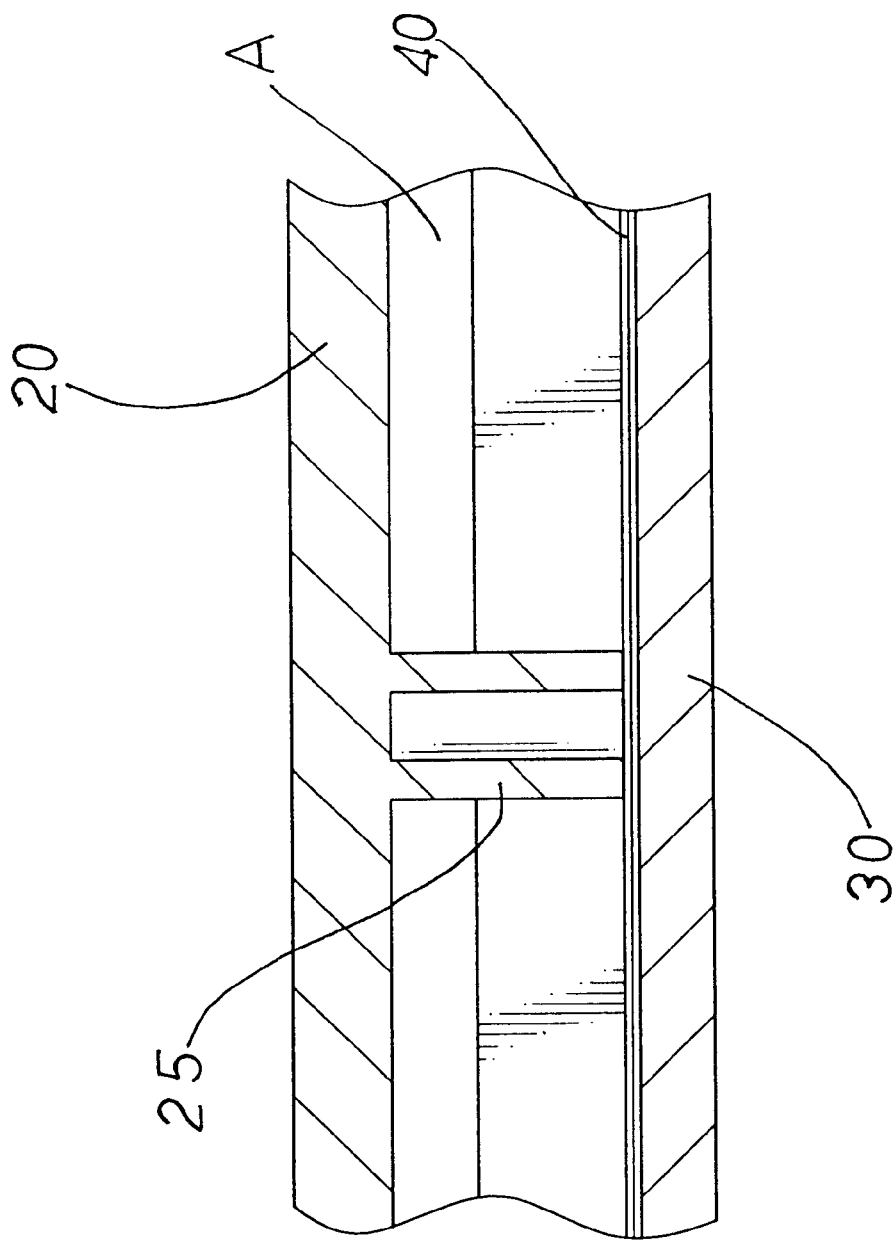
FIG. 6 is a fragmentary cross section taken along line 6—6 in FIG. 4.

The heating sheet 40 may be disposed and bonded on either the first inner surface 200 of the upper panel 20 or the second inner surface 300 of the lower panel 30 by passing the hole 42 and notches 43 through the coupling stubs 31 of the lower panel 30 and the coupling struts 21 of the upper panel 20 (the embodiment adopts the approach of bonding the heating sheet 40 to the second inner surface 300 of the lower panel 30). Then the upper panel 20 is covered on the lower panel 30 by engaging the coupling struts 21 of the upper panel 20 with the coupling stubs 31 of the lower panel 30, and to form a gap A of a desired interval between the opposing first and second inner surfaces (as shown in FIG. 4). The power cord 44 of the heating sheet 40 may be threaded through the coupled first wire trough 24 and the second wire trough 34. The press strut 25 of the upper panel 20 may press the heating sheet 40 bonded to the second inner surface 300 of the lower panel 30 to form an assembly as shown in FIG. 4. Referring to FIG. 5, the first outer flange 22 of the upper panel 20 may be wedged in a trough formed by the second outer flange 32 of the lower panel 30, and the first inner flange 23 of the upper panel 20 may be wedged in the inner trough 33 of the lower panel 30. Such a structure, in addition to the engagement between the coupling struts 21 and stubs 31 mentioned above, enables the upper panel 20 and the lower panel 30 to form a secured coupling. As shown in FIG. 6, the heating sheet 40 is bonded to the second inner surface 300 of the lower panel 30 and is depressed by the press strut 25 of the upper panel 20 to form a closed contact. The gap A of a desired distance is formed between the upper and lower panels 20 and 30. Thus the lower panel 30 has a higher temperature due to direct contact with the heating sheet 40 while the temperature of the upper panel 20 is lower due to the separation of the gap A. Therefore the two sides of the warming bed have different temperatures that may be flexibly switched to warm the pets in different climate conditions.

While the preferred embodiment of the invention has been set forth for the purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

I claim:

1. An improved warming bed for pets, comprising:

an upper panel having a first inner surface with a plurality of evenly spaced coupling struts and at least one press strut extending therefrom, said upper panel being circumscribed by a first outer flange and an inwardly spaced inner flange;

a lower panel having a second inner surface which a plurality of evenly spaced coupling stubs extending therefrom and disposed in respective correspondence with said plurality of coupling struts, said lower panel being circumscribed by a second outer flange adjacent an outer edge thereof and an inwardly spaced trough; and a heating sheet bonded to said second inner surface of said lower panel to provide a higher temperature to said lower panel than said upper panel, said heating sheet having a power cord connecting to an external power supply for heating the heating sheet and respectively radiating heat evenly through the upper panel and the lower panel, said heating sheet being formed with a plurality of open areas formed therein for respective passage of said plurality of coupling stubs therethrough;

wherein said upper panel is coupled to said lower panel to form a gap of a selected distance between the upper panel and the lower panel, said upper panel being secured to said lower panel by said plurality of coupling struts being respectively telescopically received within said plurality of coupling stubs, said at least one press strut being in contact with said heating sheet, said inner flange of said upper panel being received in said trough of said lower panel and said first and second outer flanges being disposed in abutting relationship.

* * * * *